(12) United States Patent
Alon et al.

(10) Patent No.: US 6,381,210 B1
(45) Date of Patent: *Apr. 30, 2002

(54) METHODS AND APPARATUS FOR CONCURRENTLY PROCESSING DATA FROM MULTIPLE TRACKS OF AN OPTICAL STORAGE MEDIUM

(75) Inventors: Amir Alon, Sunnyvale, CA (US); Jacob Finkelstein, Kfar Saba; Michael Naor, Rehovot, both of (IL)

(73) Assignee: Zen Research (Ireland) Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 09/013,864

(22) Filed: Jan. 27, 1998

Related U.S. Application Data

(63) Continuation-in-part of application No. 08/804,105, filed on Feb. 20, 1997, now Pat. No. 5,907,526, which is a continuation-in-part of application No. 08/559,429, filed on Nov. 15, 1995, now Pat. No. 5,627,805.

(51) Int. Cl.[7] .................................................. G11B 7/00
(52) U.S. Cl. ............................. 369/124.02; 369/124.09; 369/47.2
(58) Field of Search ............................. 369/47, 48, 54, 369/58, 59, 124, 47.16, 47.19, 47.2, 47.28, 47.35, 53.31, 53.34, 53.44, 59.21, 59.25, 124.02, 124.03, 124.05, 124.09, 124.14; 360/51

(56) References Cited

U.S. PATENT DOCUMENTS

| 4,460,988 A | 7/1984 | Gordon |
| 4,486,870 A | 12/1984 | Pettigrew et al. |
| 4,536,866 A | 8/1985 | Jerome et al. |
| 4,646,280 A | 2/1987 | Toyosawa |

(List continued on next page.)

FOREIGN PATENT DOCUMENTS

| EP | 0 273 384 A1 | 6/1988 | ........... G11B/7/007 |
| EP | 0 643 388 A1 | 3/1995 | |
| EP | 0 712 119 A2 | 5/1996 | |
| EP | 0 714 096 A1 | 5/1996 | |
| JP | HEI 7-92924 | 9/1983 | |
| JP | 60-173724 | 9/1985 | ............ G11B/7/09 |
| JP | 3-232320 | 7/1990 | |
| JP | 5-22560 | 7/1991 | |
| JP | 06089440 | 3/1994 | ............ G11B/7/00 |
| JP | 8-124319 | 10/1994 | |

Primary Examiner—Paul W. Huber
(74) Attorney, Agent, or Firm—Fish and Neave; Nicola A. Pisano; Michael J. DeHaemer, Jr.

(57) ABSTRACT

Methods and apparatus are provided for synchronously reading data from multiple tracks of an optical disk using multiple illumination beams. Circuitry is provided for use with a photodetector array to read and buffer data in parallel from the multiple adjacent tracks, while asynchronously providing processed data to a host processor. Circuitry is further provided for concurrently processing the signals read from the multiple data tracks to recover the data stored in the tracks.

29 Claims, 8 Drawing Sheets

U.S. PATENT DOCUMENTS

| | | |
|---|---|---|
| 4,720,825 A | 1/1988 | Kokado |
| 4,839,876 A | 6/1989 | Fennema |
| 4,918,676 A | 4/1990 | Miyasaka |
| 4,972,396 A | 11/1990 | Rafner |
| 4,980,876 A | 12/1990 | Abate et al. |
| 4,989,190 A | 1/1991 | Kuroe et al. |
| 5,001,732 A | 3/1991 | Nomura et al. |
| 5,081,617 A | 1/1992 | Gelbart |
| 5,111,445 A | 5/1992 | Psaltis et al. |
| 5,128,919 A | 7/1992 | Narahara et al. |
| 5,150,347 A | 9/1992 | Yanagi |
| 5,199,017 A | 3/1993 | Kagami et al. |
| 5,210,726 A | 5/1993 | Jackson et al. |
| 5,233,583 A | 8/1993 | Reno |
| 5,239,530 A | 8/1993 | Seo et al. |
| 5,245,597 A | 9/1993 | Lee et al. |
| 5,274,507 A | 12/1993 | Lee |
| 5,283,776 A | 2/1994 | Takagi |
| 5,295,125 A | 3/1994 | Oonishi et al. |
| 5,301,174 A | 4/1994 | Matoba et al. |
| 5,313,448 A | 5/1994 | Sukeda et al. |
| 5,347,506 A | 9/1994 | Matsudo et al. |
| 5,361,245 A | 11/1994 | Yoshida et al. |
| 5,394,386 A | 2/1995 | Park et al. |
| 5,426,623 A | 6/1995 | Alon et al. |
| 5,465,244 A | 11/1995 | Kobayashi et al. |
| 5,566,159 A | 10/1996 | Shapira |
| 5,581,715 A | 12/1996 | Verinsky et al. |
| 5,608,716 A | 3/1997 | Koyama et al. |
| 5,627,805 A * | 5/1997 | Finkelstein et al. ........... 369/32 |

* cited by examiner

METHODS AND APPARATUS FOR CONCURRENTLY PROCESSING DATA FROM MULTIPLE TRACKS OF AN OPTICAL STORAGE MEDIUM

RELATED APPLICATION

This application is a continuation-in-part of copending, commonly assigned application Ser. No. 08/804,105, filed Feb. 20, 1997, now U.S. Pat. No. 5,907,526, which is a continuation-in-part of commonly assigned application Ser. No. 08/559,429, filed Nov. 15, 1995, now U.S. Pat. No. 5,627,805.

FIELD OF THE INVENTION

This invention relates to methods and apparatus for retrieving information from an optical disk at high data rates by simultaneously and synchronously reading multiple adjacent tracks.

BACKGROUND OF THE INVENTION

Due to their high storage density, long data retention life, and relatively low cost, optical disks are becoming increasingly popular as a means to distribute information. Large format disks have been developed for storing full length motion pictures. The compact disk (CD) format was developed and marketed for the distribution of musical recordings and has replaced vinyl records. High-capacity, read-only data storage media, such as CD-ROM and DVD, have become prevalent in the personal computer field, to the point that the DVD format may soon replace videotape as the distribution medium for video information.

An optical disk is made of a transparent disk or substrate in which data, in the form of a serial bit-stream, are encoded as a series of pits in a reflective surface within the disk. The pits are arranged along a spiral or circular track. Data are read from the optical disk by focusing a low power laser beam onto a track on the disk and detecting the light reflected from the surface of the disk. By rotating the optical disk, the light reflected from the surface of the disk is modulated by the pattern of the pits rotating into and out of the laser's field of illumination. Optical and imaging systems detect the modulated, reflected, laser light and produce an electrical signal which may be decoded to recover the digital data stored on the optical disk. The recovered digital data, which may include error correcting codes and additional subcoded information, are further processed to recover the stored data which may then be converted to audio signals, or used as executable programs and data depending on the type of optical disk being read.

To be able to retrieve data from anywhere on an optical disk, the optical systems include a pickup assembly which may be positioned to read data from any disk track. Servo mechanisms are provided for focusing the optical system and for keeping the pickup assembly positioned over the track, despite disk warpage or eccentricity.

Because in most previously known systems the data are retrieved from the disk serially, i.e. one bit at a time, the maximum data transfer rate for an optical disk reader is determined by the rate at which the pits pass by the pickup assembly. The linear density of the bits and the track pitch are fixed by the specification of the particular optical disk format. For example, CD disks employ a track pitch of 1.6 $\mu$m, while DVD employs a track pitch only about one-half as wide.

Previously known methods of increasing the data transfer rate of optical disk readers have focused on increasing the rate at which the pits pass by the pickup assembly by increasing the rotational speed of the disk itself. Currently, drives with rotational speeds of up to 16x standard speed are commercially available, and even faster speeds have been achieved by moving to constant angular velocity designs. However higher disk rotational speeds place increasing demands on the optical and mechanical subsystems within the optical disk player, create greater vibration, and may make such players more difficult and expensive to design and manufacture.

Other previously known techniques for increasing average data transfer rates involve methods to intelligently anticipate future read requests by a host processor. It has been observed that data access by computers frequently exhibit "locality of reference," which means that a future data access will be local, in either space or time, to a previous data access. Thus a CD-ROM drive or controller can "read ahead" and buffer the data that the host processor is likely to request next. When the host processor next requests data from the optical disk drive, the drive first checks if the requested data have already been read and buffered. If the data have already been buffered, the drive simply sends the buffered data to the host, avoiding the delays associated with repositioning the pickup assembly and reading data from the optical disk itself. While such caching techniques may speed up average data access times, the maximum data transfer rate is still limited by the rotational velocity of the optical disk within the optical disk reader.

Commonly assigned U.S. Pat. No. 5,627,805 describes a system to increase disk reading speeds by reading multiple tracks simultaneously. The data is read using a wide area reading beam, which is focussed onto a plurality of tracks on the disk. A detector comprising a matrix of photo-detector elements provides an image of the wide area, from which track signal data for each of a plurality of tracks is extracted by a virtual tracking system. Alternatively, the track data signals may be provided by a multi-beam optical pickup, as described in commonly assigned, copending U.S. patent application Ser. No. 08/804,105. The track data signals are then sampled, to produce a plurality of digital data streams, which are multiplexed into a single data stream before demodulation, decoding, and error correction.

Since the multiplexed data stream contains data from multiple tracks, which may be read from a disk that is spinning at multiple times the standard speed, the rate at which data in the multiplexed stream must be processed may be very high. For example, in a multi-beam CD-ROM reader that reads seven tracks simultaneously and spins the disk at 8x the standard speed (giving the approximate equivalent of a 56x drive), the data rate in the multiplexed data stream will be approximately 240 million bits per second in the demodulation stage (17 million words per second at 14 bits per word). By the time the data reaches the error correction stage, the required data rate will have dropped to approximately 79 million bits per second (9.9 million bytes per second). As can be seen, the rate at which data in such a system must be processed requires use of high performance devices to perform the functions at each of the stages in the processing chain.

The present application is directed to an improvement in the system described in the above-incorporated patent, wherein the multiplexer is moved to a later position in the processing chain, so that the plurality of data streams from multiple tracks on the disk may be demodulated, decoded, and error corrected before being multiplexed into a single data stream. Apparatus in accordance with the present invention may use a plurality of inexpensive, relatively low performance devices to perform the steps of demodulation, decoding, and error correction, while delivering throughput similar to that achieved by a high performance device performing these operations on a single multiplexed stream of data. Using the techniques of the present invention, it may be possible to construct a high performance system for processing the multiple data streams read from an optical disk, and which has a higher throughput than other similar systems, using standard low cost components.

It would therefore be desirable to provide apparatus and methods which permit simultaneous processing of data from multiple tracks in an optical disk reader.

It would also be desirable to provide demodulation, decoding, and error correction circuitry having higher throughput and at lower cost than previously known circuitry for processing the data from multiple tracks in an optical disk reader.

SUMMARY OF THE INVENTION

In view of the foregoing, it is an object of the present invention to provide apparatus and methods for simultaneous processing of data from multiple tracks in an optical disk reader.

It is a further object of this invention to provide demodulation, decoding, and error correction circuitry having higher throughput and faster time to market than previously known circuitry for processing the data from multiple tracks in an optical disk reader.

These and other objectives of the invention are accomplished by placing the multiplexer in a position late in the processing stream, so that the data from the multiple tracks remain separate through the processing stages of demodulation, decoding, and error correction. Implementation of this scheme requires providing multiple demodulation, decoding, and error correction units.

Alternatively, the multiplexer may be placed in the processing chain between the demodulation stage and the decoding stage, so that demodulation is performed in parallel on the multiple data streams, but decoding and error correction are performed on a single, multiplexed data stream. The multiplexer could also be placed in the processing stream between the decoding stage and the error correction stage, so that demodulation and decoding are performed in parallel on the multiple data streams, and error correction is performed on a single, multiplexed data stream.

Further features of the invention, its nature and various advantages will be more apparent from the accompanying drawings and the following detailed description of the preferred embodiments.

DETAILED DESCRIPTION OF THE INVENTION

Figure 1:
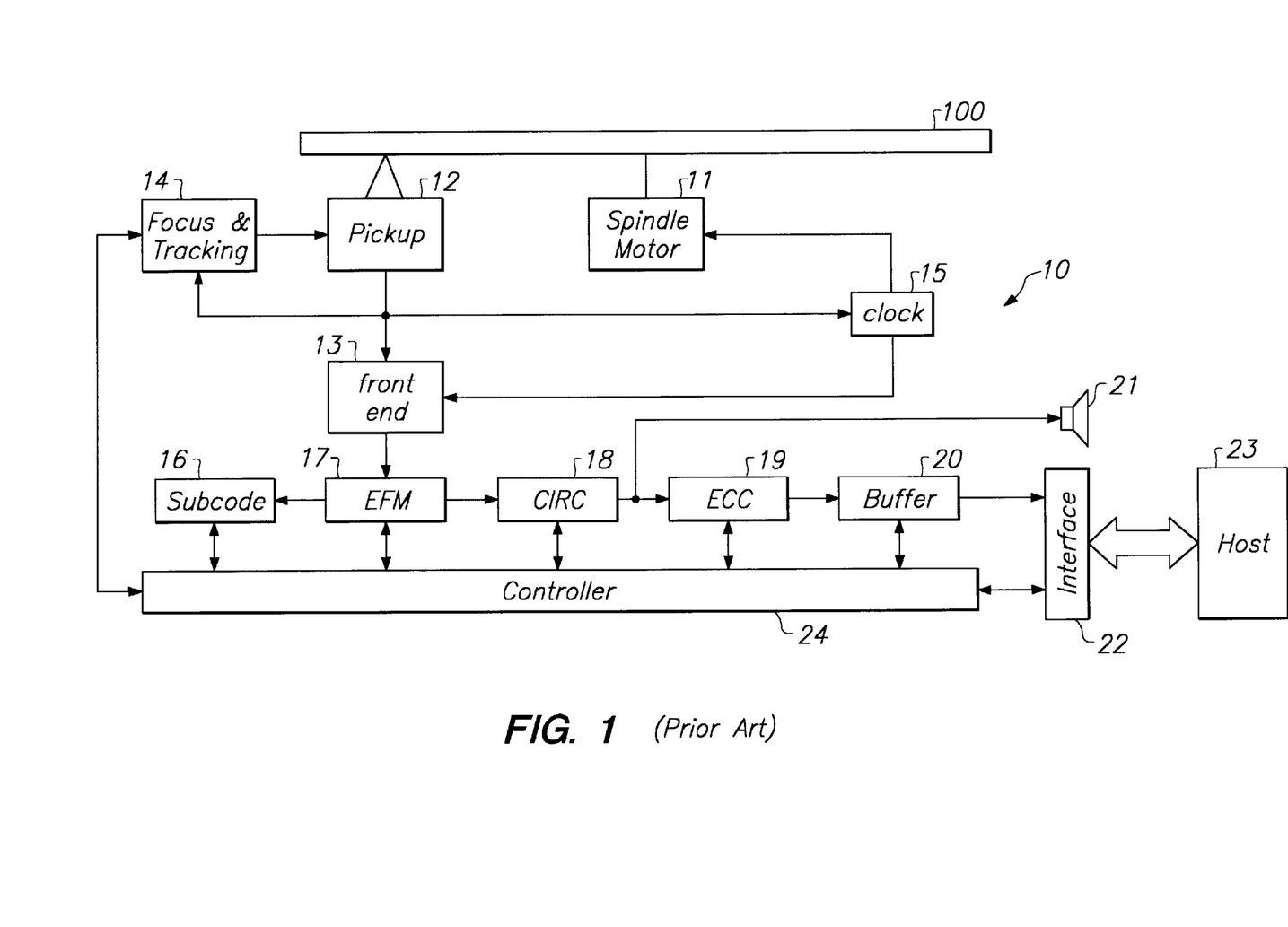
FIG. 1 is an illustrative block diagram of a previously known single beam optical disk reader.

By way of overview, a brief description of the components and operation of a previously known optical disk reader 10 is provided with respect to FIG. 1. The detailed description of the design and operation of such previously known optical disk readers may be found, for example, in *Compact Disk Technology*, H. Nakajima and H. Ogawa, published by Ohmsha, Ltd., Japan (1992), translated by Aschmann, C., IOS Press, Inc., Burke, Va., and *The Compact Disk Handbook*, Ken C. Pohlmann (2nd Ed. 1992), A-R Editions, Inc., Madison, Wis., both of which are incorporated herein in their entirety by this reference. An overview of multi-beam optical disk reader 25 is given with respect to FIG. 2.

Figure 2:
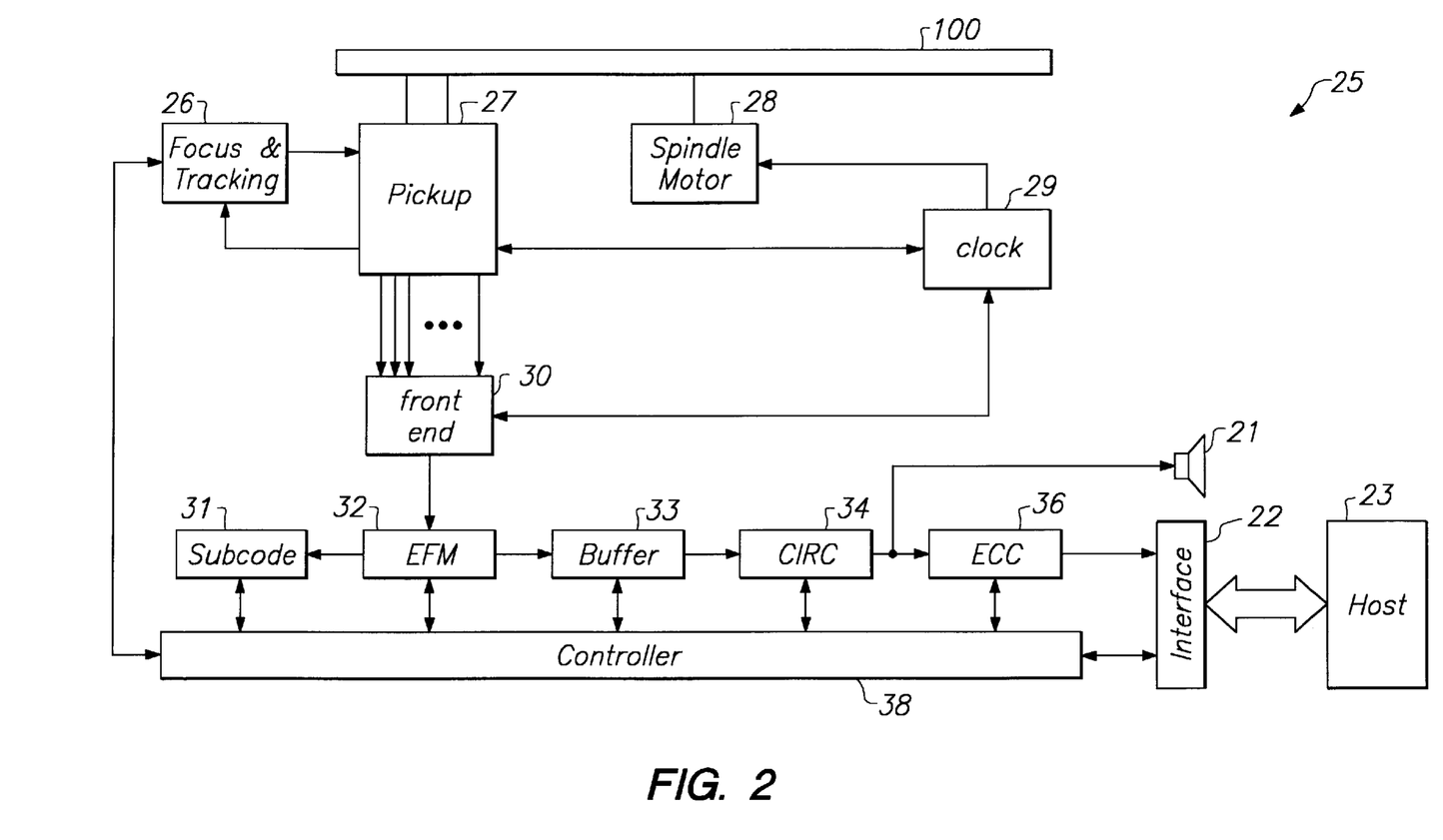
FIG. 2 is an illustrative block diagram of a multi-beam optical disk reader.

It will of course be understood that the systems of FIGS. 1 and 2 are merely illustrative of the various types of optical disk apparatus in which the methods and apparatus of the present invention may be employed. Applicants expect that the invention described herein may be advantageously employed in any multi-beam optical disk system, including DVD systems.

Overview of a Prior Art Optical Disk System

Referring to FIG. 1, illustrative previously known optical disk reader 10 comprises a spindle motor 11 that rotates optical disk 100 at high speed and pickup assembly 12 including an illumination source and a photodetector for generating electrical signals representative of information-bearing pits formed in a reflective surface within optical disk 100. The electrical signals from the photodetector of pickup assembly 12 are then passed to front end circuitry 13 for extracting a digital data signal. Under the control of controller 24, the data signal is further processed by eight-to-fourteen (EFM) demodulation circuitry 17, Cross Interleaved Reed-Solomon Code (CIRC) decoding circuitry 18, error correction code (ECC) circuitry 19, and subcode circuitry 16. Controller 24 also controls focus and tracking circuitry 14, as well as buffer 20 and interface 22.

For a digital audio system, the data signals may be processed into suitable analog signals (using circuitry not shown) connected to audio means 21. Similarly, if the optical disk contains video images, the data signals may be processed for display on a TV or monitor. In computer applications the data signals are typically transferred from buffer 20 to host processor 23 via interface 22.

Spindle motor 11 spins optical disk 100 at a speed that depends upon the radial location of pickup assembly 12 (for example, for a 1× CD-ROM spindle speed, approximately 200–500 RPM), to maintain a constant linear velocity of an optical disk track relative to pickup assembly 12. For a CD-ROM format, this linear velocity is generally 1.4 m/s, while for the DVD format it approaches 4 m/s. Pickup assembly 12 typically includes a laser diode that illuminates only a single data track on optical disk 100 and an optical sensor onto which an image reflected from the optical disk is projected. The intensity, or other property, of the light beam reflected from the surface of optical disk 100 is modulated by inhomogeneities in the reflective surface of the optical disk (i.e., bumps or pits, referred to hereinafter as "data spots") arranged in spiral or circular tracks on optical disk 100.

Pickup assembly 12 includes circuitry to generate an electronic signal representative of the modulation in the illumination impinging upon its optical sensor due to the presence of the data spots. To ensure that the laser illumination remains focused on the reflective surface of optical disk 100, pickup assembly 12 also provides signals to focus and tracking circuitry 14.

The data spots are recorded on optical disk 100 using a modulation code that permits a data clock to be recovered from the data as it is read off of the optical disk. Clock circuitry 15 includes phase-locked-loop (PLL) circuitry for recovering the data clock from, and maintaining the data clock in synchrony with, the modulated electronic signal from pickup assembly 12. In addition to being used for extracting the data from the modulated signal, the data clock is representative of the linear velocity of the data track relative to pickup assembly 12 and may be used as a feedback signal to control the speed of spindle motor 11 to maintain a constant linear velocity.

Front end circuitry 13 uses the data clock from PLL 15 to recover a serial stream of bits from the electronic signal. Front end circuitry 13 contains additional circuitry to identify synchronization codes in the bit stream so that the serial bit stream may be correctly assembled into multi-bit data words which are transferred to demodulation circuitry 17. Demodulation circuitry 17 may be programmed for eight-to-fourteen demodulation, eight-to-fifteen demodulation (as in the SD systems), eight-to sixteen demodulation (EFM Plus), or may use another suitable demodulation scheme. The demodulated data words, or symbols, are then assembled into blocks and decoded by CIRC decoder 18 using a form of Cross Interleaved Reed-Solomon code, for example, CIRC for CD-formats and PI PO structure for DVD. Demodulated data words are also provided to subcode processor 16 which extracts data, such as block numbers, or song titles, that may be recorded in the subcode channels embedded in each block of data words.

For video and audio optical disk players, the data from CIRC decoder 18 represents, in digital form, the video or audio signal that was originally recorded and stored on the disk. These signals may then be converted to analog signals and the original recorded signal reproduced using conventional audio or video devices 21. Errors in the recovered audio or video signals are handled by interpolation and filtering circuitry (not shown) to calculate a value to use in place of the erroneous data. Because of the interpolation process, isolated errors in an audio or video signal are unlikely to be noticed when listening to the audio or viewing the video signals.

However, since a single bit error in data representing a computer program may render the program inoperable or the data unusable, optical disks used for the storage and distribution of data and programs must have very low data error rates. To reduce the data error rates to acceptably low levels, error correction codes (ECC) are added to the data when it is recorded to the disk. ECC circuitry 19 uses error correcting codes to detect and possibly correct errors in the data. Finally, the data are buffered in memory buffer 20 for transfer to host processor 23 via interface circuitry 22. Controller 24 coordinates operation of each of the optical disk reader subsystems and to control the operation of the optical disk reader as a whole.

Referring now to FIG. 2, an optical disk reader similar to that described in U.S. Pat. No. 5,627,508 is described. Apparatus 25 provides a high data transfer rate by reading multiple tracks of data from an optical disk simultaneously. Much of the circuitry of FIG. 2 may be common to or readily adapted from the circuitry of the system of FIG. 1. Accordingly, the following description focuses on the differences between previously known single beam optical disk reader 10 of FIG. 1, and multi-beam optical disk reader 25. These differences are described in copending, commonly assigned U.S. patent application Ser. No. 08/804,105.

In particular, apparatus 25 includes a multi-beam, multi-detector pickup assembly 27 that simultaneously illuminates and reads multiple adjacent data tracks of disk 100; phase-lock loop circuitry that permits a clock 29 associated with a reference track to be used for synchronizing the recovery of data from neighboring tracks; and a parallel write/asynchronous read architecture that enables blocks of data to be read from the optical disk, processed and written to a buffer in parallel while being asynchronously retrieved from the buffer by a host computer.

Multi-beam optical disk reader 25 of FIG. 2 includes pickup assembly 27 including a source of laser illumination, a diffraction grating for splitting the laser illumination into three or more illumination beams and a corresponding number of photodetectors onto which multiple illumination beams, reflected from the optical disk, are focused by an optical system. Each of the multiple photodetectors in pickup assembly 27 generates an electrical signal representing data read from a corresponding data track on optical disk 100, and provides that electrical signal to front end circuitry 30.

Front end circuitry 30 of FIG. 2 performs a function similar to that of front end circuitry 13 of FIG. 1, except that multiple bit streams are processed concurrently, so additional circuitry is provided for buffering and synchronizing data transfers to subsequent processing circuitry. Front end circuitry 30 also includes a multiplexer for routing multiple data streams to demodulation circuitry 32 in the form of a single multiplexed data stream.

Demodulation circuitry 32, subcode circuitry 31, decoder circuitry 34, and error correction circuitry 36 of optical disk reader 25 are all similar in operation to their counterparts in optical disk reader 10 of FIG. 1. They differ principally in that they may be required to handle a much greater data throughput than similar circuitry used in single-beam optical disk reader 10.

Buffer memory 33 is provided to buffer the data read from the multiple data tracks, and to decouple the process of reading data from optical disk 100 from the process of transferring the data to host processor 23. Buffer 33 is large enough to hold about as many data blocks from multiple data tracks of optical disk 100 as can be read in one revolution of optical disk 100. Controller 38 maps data from the multiple data tracks to buffer 33 so that individual data blocks will be correctly assembled without overwriting one another. As will be appreciated by those of skill in the art of buffer design, this mapping may be either dynamic or static.

DESCRIPTION OF THE PRESENT INVENTION

Figure 3:
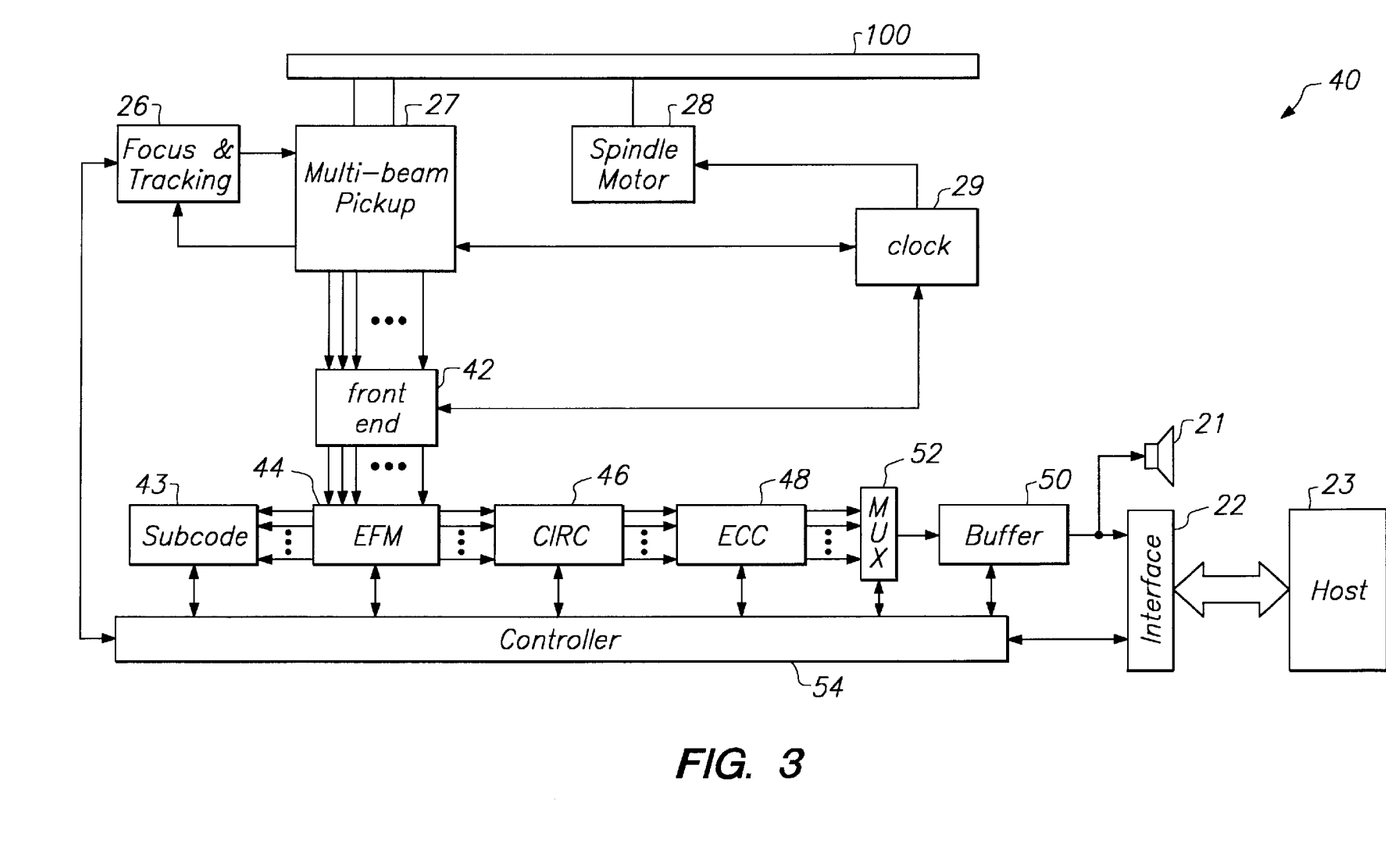
FIG. 3 is a block diagram of a multi-beam optical disk reader built in accordance with the principles of the present invention.

Referring to FIG. 3, multi-beam optical disk reader 40, constructed in accordance with the principles of the present invention is described. Multi-beam optical disk reader 40 is very similar to multi-beam optical disk reader 25, of FIG. 2, except that multiple data streams are processed concurrently through the entire processing chain, rather than just the front end. Instead of using a multiplexer in front end circuitry 42 to combine the multiple data streams into a single multiplexed data stream, multi-beam optical disk reader 40 places multiplexer 52 at the end of the processing chain, after the data are read, demodulated, decoded, and error corrected.

Front end circuitry 42 recovers multiple streams of bits from the electronic signals corresponding to the multiple tracks read by multi-beam optical pickup 27, in the manner described in detail in commonly assigned, copending U.S. patent application Ser. No. 08/804,105, Filed Feb. 20, 1997, by recovering the clock for one track, and adjusting that clock signal to account for differences in the linear velocities of the tracks. Alternatively, front end circuitry 42 may use a separate phase-locked loop (PLL) for each track to regenerate a clock signal for each of the tracks being read. Front end circuitry 42 also assembles the streams of bits into multi-bit data words which are transferred to demodulation circuitry 44 as multiple streams of data words.

Demodulation circuitry 44 demodulates each of the streams of data words into demodulated data words, or symbols. These symbols are assembled into frames, each containing multiple symbols, which are made available to decoder circuitry 46 as multiple streams of frames. Demodulation circuitry 44 may be programmed for eight-to-fourteen demodulation, eight-to-fifteen demodulation (as in the SD systems), eight-to sixteen demodulation (EFM Plus), or may use another suitable demodulation scheme. Demodulated data words are also provided in multiple streams to subcode processor 43 which extracts data, such as frame numbers, or song titles, that may be recorded in the subcode channels embedded in each frame of data words.

Decoder circuitry 46 uses a form of Cross Interleaved Reed-Solomon Code, such as CIRC for CD-formats and PI PO structure for DVD, to decode the frames of data-received in each of the data streams. The decoded frames are then assembled into sectors, which contain the data from multiple frames, and are made available to error correction circuitry 48 as multiple streams of sectors. Each sector contains a sector type identifier, used for determining which type of error correction or other processing to perform on the sector. Sectors also contain synchronization codes, data, and may contain error correction codes.

If the sector type identifier indicates that a sector contains error correction codes, error correction circuitry (ECC) 48 uses the error correction codes to detect and possibly correct errors in the data. The corrected data from each of the data streams is then made available to buffer memory 50 through multiplexer (MUX) 52. Buffer memory 50 uses MUX 52 to select one of the data streams, and transfers one sector of corrected data from ECC circuitry 48 to memory. Buffer memory 50 permits stored data to be transferred to host processor 23 via interface circuitry 22.

Controller 54 coordinates operation of each of the optical disk reader subsystems and controls the operation of the optical disk reader as a whole.

Figure 4:
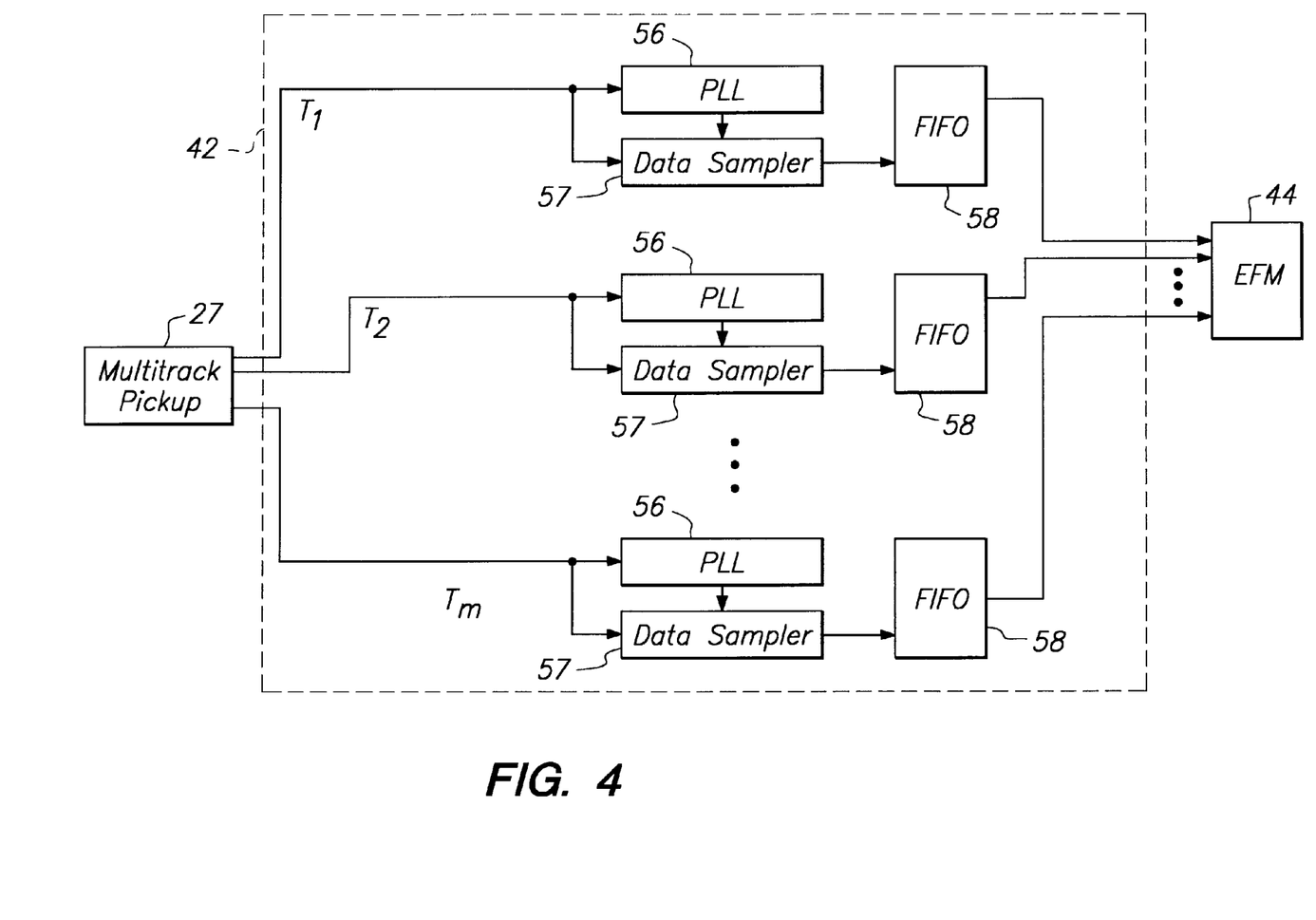
FIG. 4 is a block diagram of the front end circuitry for extracting data from the signals output by the pickup assembly of FIG. 3.

FIG. 4 shows a detailed view of front end circuitry 42 constructed using a separate PLL for each track. Multi-beam pickup assembly 27 outputs track data signals, $T_1 \ldots T_m$, corresponding to m tracks being read. Since an accurate data clock is needed to extract data from a track data signal, and the signals from each track will differ in frequency and phase, the track data signals $T_1 \ldots T_m$ are provided to separate phase-locked loops (PLLs) 56 which are used to recover a clock signal for each track. These clock signals are used by data samplers 57 to recover digital data from the tracks. The serial bit streams are assembled into parallel data words and are then sent to first-in/first-out buffers (FIFOs).

For an 8× multi-beam CD-ROM reader, each stream in front-end circuitry 42 will produce approximately 2.5 million 14-bit data words per second, which can easily be handled by inexpensive commercially available circuitry. By contrast, if the data from an 8× speed, seven-beam system were combined into a single data stream at the front end stage of processing, the data rate would be approximately 17. 5 million 14 bit words per second.

It will, of course, be understood that the methods and apparatus presented in commonly assigned, co-pending U.S. patent application Ser. No. 08/804,105, filed Feb. 20, 1997, which permit a clock to be used to recover clocks for all of the track data signals, alternatively could be used in the front end circuitry of a multi-beam optical disk reader built in accordance with the principles of the present invention.

Figure 5A:
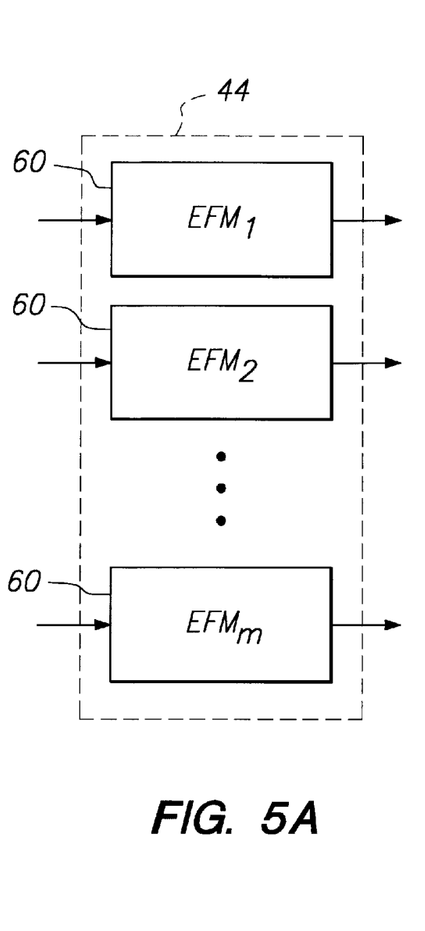
FIGS. 5A, B, and C are block diagrams of the demodulator circuitry, decoder circuitry, and error correction circuitry, respectively, of the optical disk reader of FIG. 3.
Figure 5B:
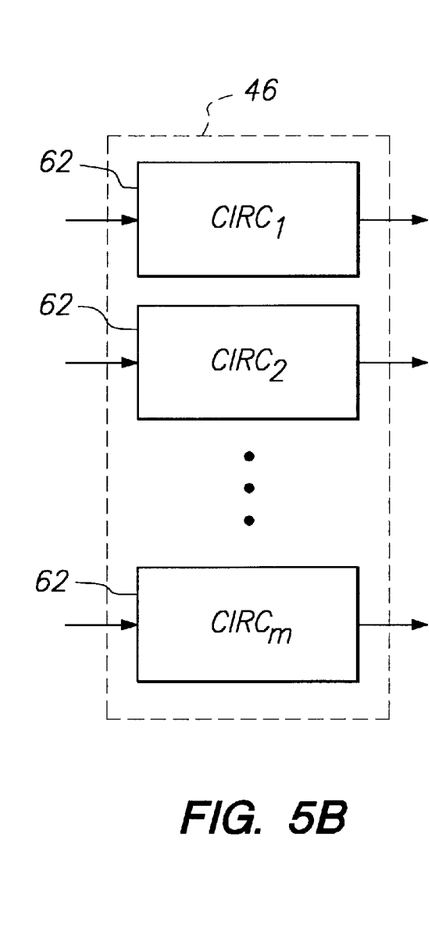
Figure 5C:
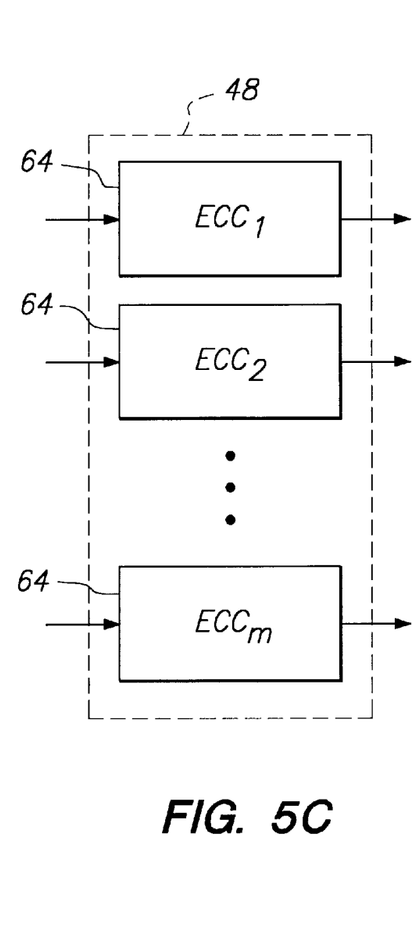

Referring now to FIGS. 5A–C, demodulator circuitry 44, decoder circuitry 46, and error correction circuitry 48 are shown. Demodulator circuitry 44, shown in FIG. 5A, comprises m single-stream demodulator units 60, each of which handles the data words sent to it through one FIFO 58 of front end circuitry 42. Each of demodulator units 60 demodulates data words from one track into demodulated data words, or symbols, and assembles the symbols into frames. Additionally, demodulator units 60 may extract subcode data from the data stream, and send the subcode data to subcode processor 43.

For an 8× multi-beam CD-ROM reader, each demodulator unit 60 assembles 58,800 frames per second, each frame containing 32 bytes, for a total of approximately 1.9 million bytes per second. If the data from a seven beam, 8× system were combined into a single stream at the demodulator stage, the combined data stream would have a data rate of approximately 13.2 million bytes per second. Thus, applicant expects that retaining multiple data streams will permit use of a greater number of lower cost (slower) components.

FIG. 5B shows decoder circuitry 46, which comprises one single-track Cross Interleaved Reed-Solomon Code (CIRC) decoder unit 62 for each of the m data tracks being processed. Data from demodulator units 60 are sent into CIRC decoder units 62. Each of CIRC decoder units 62 decodes data from a single track, and assembles the data into sectors, which are sent to error correction circuitry 48.

For an 8× multi-beam CD-ROM reader, each CIRC decoder unit 62 assembles 600 sectors per second, each sector containing 2352 bytes, for a total of approximately 1.4 million bytes per second. If the data from a seven beam, 8× system were combined into a single stream at the decoder stage, the combined data stream would have a data rate of approximately 9.9 million bytes per second.

FIG. 5C shows error correction circuitry 48, which comprises one single-track error correction unit 64 for each of the m data tracks being processed. Data from CIRC decoder units 62 are sent into the error correction units 64. Each of the error correction units 64 examines a sector-type identifier byte for each sector sent by CIRC decoder units 62 to determine which error correction technique (if any) to-perform on a sector. If error correction is required, error correction unit 64 applies the error correction technique indicated by the sector-type identifier byte, and outputs the corrected sector data. If the sector is of a type which does not require correction, error correction unit 64 need only strip any synchronization bytes, or other extraneous formatting from the sector data.

For an 8× multi-beam CD-ROM reader, each error correction unit 64 processes 600 sectors per second, each sector containing up to 2336 bytes of data, plus four bytes of header information, for a total of approximately 1.4 million bytes per second. A multiplexer combining data from a seven beam, 8× system after the error correction stage would need to be able to handle a throughput of approximately 9.8 million bytes per second.

Figure 6:
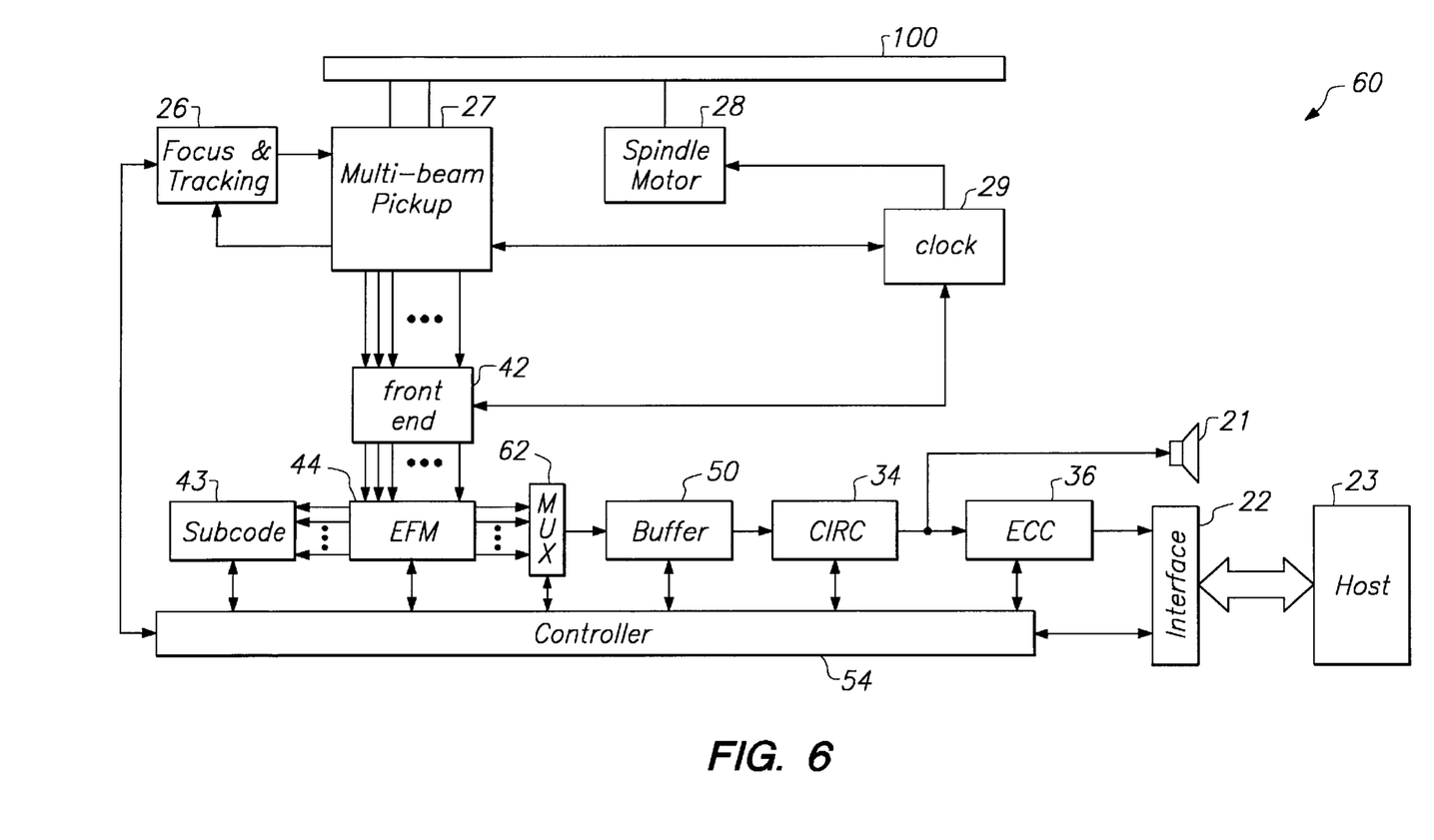
FIGS. 6 and 7 are block diagrams of alternative embodiments of multi-beam optical disk readers built in accordance with the principles of the present invention.

Referring now to FIG. 6, an alternate embodiment of a multi-beam optical disk reader built in accordance with the principles of the present invention is shown. As will be understood from the above discussion, the data rate of a single multiplexed data stream becomes smaller in later stages of the processing chain. It may therefore be practical to use circuitry which processes the track data concurrently for the early stages in the processing chain, such as the front end processing and demodulation, where the data rate is highest, while using circuitry which processes a single data stream for later stages, such as decoding and error correction. Accordingly, in optical disk reader 60, Multiplexer 62 has been placed between demodulation circuitry 44 and decoder circuitry 34 in the processing chain. Multiplexer 62 combines the data from all of the single-track demodulation units of demodulation stage 44 into a single data stream. As shown in FIG. 6, multiplexer 62 sends the combined stream of data to buffer memory 50, where it is stored until the frames are requested by host 23, or are no longer needed. Alternatively, if later stages are capable of handling the throughput required to process the combined data stream, buffer memory 50 can be placed at the end of the processing chain, and the combined data stream from multiplexer 62 may be sent directly into decoder stage 34.

Figure 7:
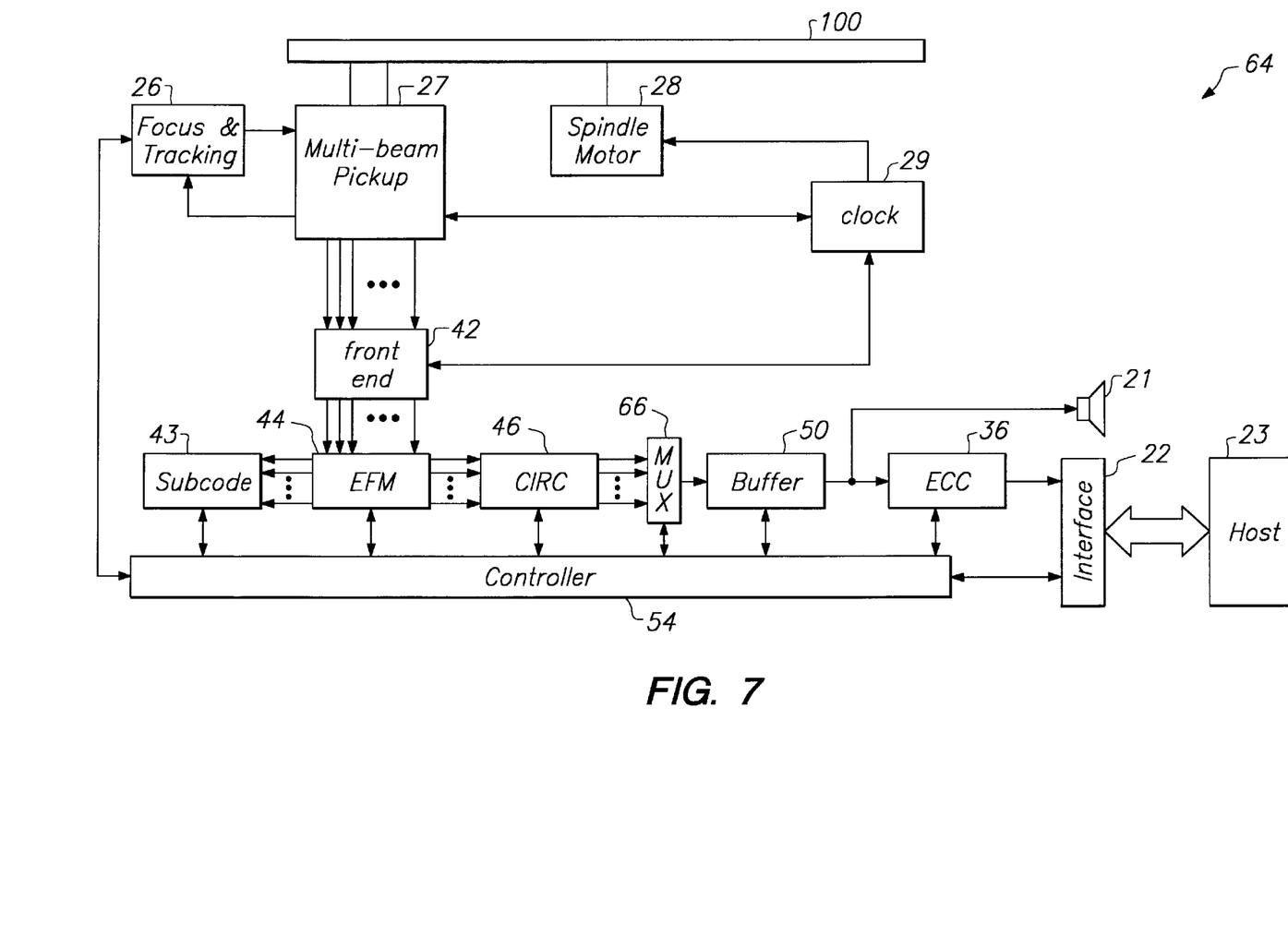

FIG. 7 shows another alternative embodiment, in which multiplexer 66 is located between decoder circuitry 46 and error correction circuitry 36 in the processing chain. Multiplexer 66 combines the data streams from the single-track decoder units in decoder stage 46 into a single data stream, which is stored in buffer memory 50. If the error correction stage is capable of handling the throughput required to process the combined data stream, buffer memory 50 may be placed at the end of the processing chain, after error correction stage 36.

Figure 8:
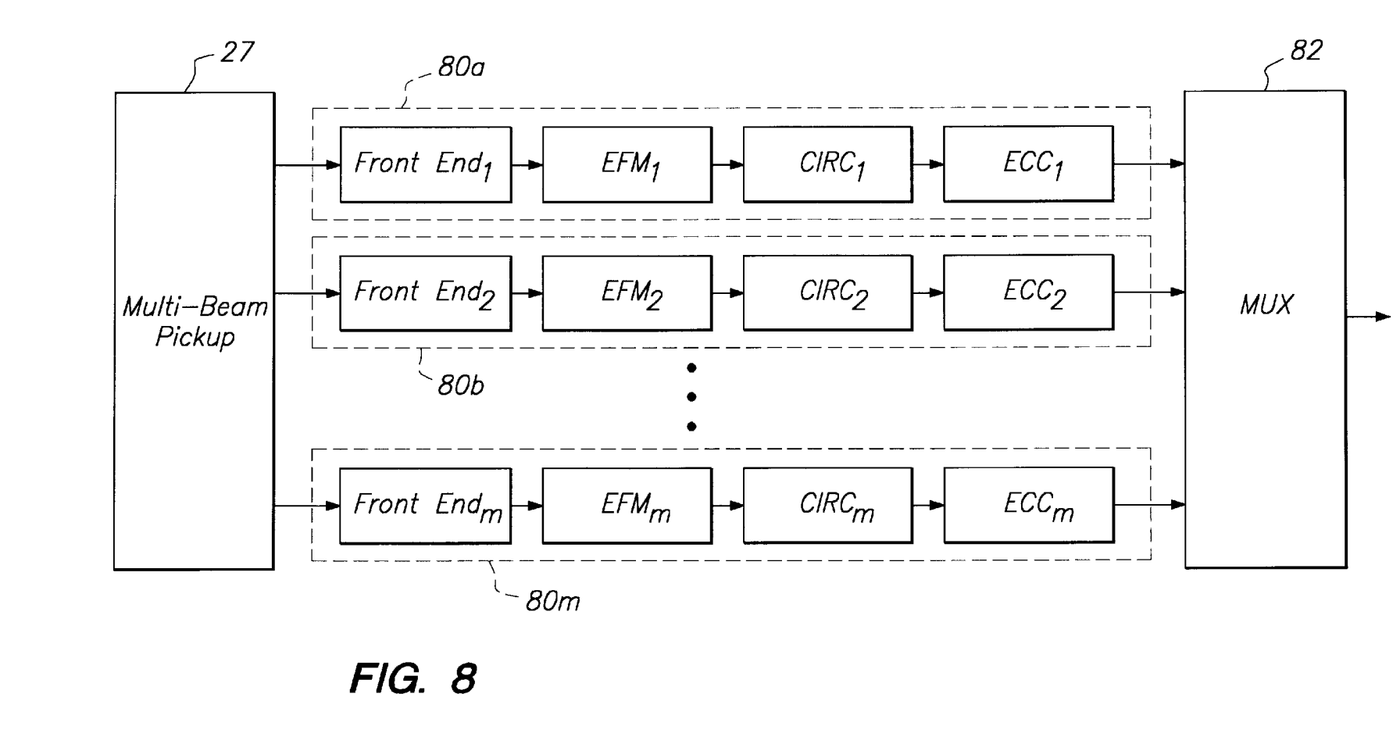
FIG. 8 is a block diagram of an alternate arrangement for the processing chain of an optical disk reader built in accordance with the principles of the present invention.

FIG. 8 shows a yet further alternative arrangement of the processing chain for a multi-beam optical disk reader constructed in accordance with the principles of the present invention. The processing chain shown in FIG. 8 is arranged according to which beam is being processed, rather than according to function. Thus, data from the first beam are sampled, demodulated, decoded, and error corrected by data stream processor 80a, while data from the second beam are processed by data stream processor 80b, and so on. Multiplexer (MUX) 82 multiplexes data from the data streams into a single data stream. Embodiments in which multiplexer 82 is located after the demodulator (EFM) stage or the decoder (CIRC) stage may also be arranged according to the beam being processed, rather than by function.

Arranging the circuitry as shown in FIG. 8 permits standard, relatively inexpensive parts, which were designed for use in single-beam optical disk readers to be used to build a multi-beam optical disk reader in accordance with the principles of the present invention. Commercially available CD controllers combine several of the processing stages of a single-beam optical disk reader into a single integrated circuit. The OTI-975, by Oak Technology of Sunnyvale, Calif., for example, is capable of performing decoding and error correction on a single data stream for a 16× CD-ROM reader. Other commercial parts manufactured by Philips Electronics N.V., and Sony Semiconductor provide similar functions, and perform clock recovery (using PLLs), data sampling, and demodulation for use with a single-beam optical disk reader. Data stream processors 80a–80m could be assembled from such standard parts, and then combined using MUX 82 to form the processing chain for a multi-beam optical disk reader in accordance with the arrangement of the circuitry shown in FIG. 8.

While preferred illustrative embodiments of the present invention are described above, it will be evident to one skilled in the art that various changes and modifications may be made without departing from the invention. It is intended in the appended claims to cover all such changes and modifications which fall within the true spirit and scope of the invention.

What is claimed is:

1. Apparatus for simultaneously reading multiple data tracks of an optical disk, the apparatus comprising:

a pickup assembly providing a plurality of data signals corresponding to data stored in a plurality of neighboring data tracks of an optical disk;

sampling circuitry for recovering a plurality of digital data streams from the plurality of data signals;

a multiplexer for combining the plurality of digital data streams into a single data stream; and processing circuitry for extracting formatted data from the plurality of digital data streams, the processing circuitry comprising a concurrent portion, disposed before the multiplexer, wherein the plurality of digital data streams are processed simultaneously, and a serial portion, disposed after the multiplexer, wherein the single data stream is processed to produce the formatted data.

2. The apparatus as defined in claim 1, wherein the processing circuitry comprises a plurality of processing stages which are applied to the plurality of digital data streams to extract the formatted data.

3. The apparatus as defined in claim 2, wherein the processing stages include a demodulation stage, a decoding stage, and an error correction stage.

4. The apparatus as defined in claim 3, wherein the processing circuitry includes a buffer, in which data may be temporarily stored.

5. The apparatus as defined in claim 4, wherein the demodulation stage, decoding stage, and error correction stage are all part of the concurrent portion of the processing circuitry, the buffer is part of the serial portion of the processing circuitry, and the multiplexer is disposed between the error processing stage and the buffer.

6. The apparatus as defined in claim 4, wherein the demodulation stage is part of the concurrent portion of the processing circuitry, and the decoding stage, error correction stage, and buffer are part of the serial portion of the processing circuitry.

7. The apparatus as defined in claim 6, wherein the multiplexer is interposed between the demodulation stage, and the buffer.

8. The apparatus as defined in claim 6, wherein the multiplexer is interposed between the demodulation stage and the decoding stage.

9. The apparatus as defined in claim 4, wherein the demodulation stage and decoding stage are part of the concurrent portion of the processing circuitry, and the error correction stage and buffer are part of the serial portion of the processing circuitry.

10. The apparatus as defined in claim 9, wherein the multiplexer is interposed between the decoding stage and the buffer.

11. The apparatus as defined in claim 9, wherein the multiplexer is interposed between the decoding stage and the error correction stage.

12. The apparatus as defined in claim 1, wherein the sampling circuitry comprises a clock recovery circuit for each of the data signals.

13. The apparatus as defined in claim 12, wherein each clock recovery circuit comprises phase-locked loop circuitry.

14. The apparatus as defined in claim 3, wherein the demodulation stage comprises circuitry implementing any one of eight-to-fourteen demodulation, eight-to-fifteen demodulation, or eight-to sixteen demodulation.

15. The apparatus as defined in claim 3, wherein the decoding stage comprises circuitry implementing a cross-interleaved Reed-Solomon decoder.

16. Apparatus for simultaneously reading multiple data tracks of an optical disk, the apparatus comprising:

a pickup assembly providing a plurality of data signals corresponding to data stored in a plurality of data tracks of an optical disk;

sampling circuitry for recovering a plurality of digital data streams from the plurality of data signals, wherein the sampling circuitry comprises synchronizing circuitry for permitting a single clock recovery circuit to be used to sample the plurality of data signals, the synchronizing circuitry correcting for variations in the linear velocities of the plurality of data tracks;

a multiplexer for combining the plurality of digital data streams into a single data stream; and processing circuitry for extracting formatted data from the plurality of digital data streams, the processing circuitry comprising a concurrent portion, disposed before the multiplexer, wherein the plurality of digital data streams are processed simultaneously, and a serial portion, disposed after the multiplexer, wherein the single data stream is processed to produce the formatted data.

17. A method for reading from a plurality of data tracks in a region of an optical disk to extract formatted data, the method comprising the steps of:

detecting illumination modulated by the plurality of data tracks;

producing a plurality of data signals-responsive to the modulation, the plurality of data signals corresponding to the plurality of data tracks;

sampling the plurality of data signals to produce a corresponding plurality of digital data streams;

concurrently processing the plurality-of digital data streams;

multiplexing the plurality of digital data streams into a single serial data stream; and processing the serial data stream to produce the formatted data.

18. The method of claim 17, wherein the step of concurrently processing the plurality of digital data streams further comprises the steps of:

concurrently demodulating the plurality of digital data streams;

concurrently decoding the plurality of digital data streams; and concurrently error correcting the plurality of digital data streams.

19. The method of claim 18, wherein the step of multiplexing the plurality of digital data streams follows the step of concurrently error correcting the plurality of digital data streams.

20. The method of claim 17, wherein the step of concurrently processing the plurality of digital data streams further comprises the step of concurrently demodulating the plurality of digital data streams, and the step of processing the serial data stream further comprises the steps of:

decoding the serial data stream; and error correcting the serial data stream.

21. The method of claim 20, wherein the step of multiplexing the plurality of digital data streams follows the step of concurrently demodulating the plurality of digital data streams.

22. The method of claim 17, wherein the step of concurrently processing the plurality of digital data streams further comprises the steps of:

concurrently demodulating the plurality of digital data streams; and concurrently decoding the plurality of digital data streams; and the step of processing the serial data stream further comprises the step of error correcting the serial data stream.

23. The method of claim 22, wherein the step of multiplexing the plurality of digital data streams follows the step of concurrently decoding the plurality of digital data streams.

24. The method of claim 17, wherein the step of sampling the plurality of data signals further comprises the step of generating a separate clock signal for each one of the plurality of data signals.

25. A method for processing a plurality of data signals simultaneously read from a plurality of data tracks of an optical disk to extract formatted data, the method comprising the steps of:

sampling the plurality of data signals to produce a plurality of digital data streams, wherein the step of sampling the plurality of data signals further comprises the step of correcting a single clock signal to account for differences in the plurality of data signals caused by variations in the linear velocity of the plurality of data tracks;

concurrently processing the plurality of digital data streams;

multiplexing the plurality of digital data streams into a single serial data stream; and processing the serial data stream to produce the formatted data.

26. Apparatus for simultaneously reading from a plurality of tracks of an optical disk, the apparatus comprising:

a pickup assembly for detecting illumination modulated by data stored in a plurality of neighboring data tracks of an optical disk and providing a plurality of data streams corresponding to the detected modulation;

a plurality of data stream processing circuits, each data stream processing circuit processing one of the plurality of data streams; and a multiplexer for combining the outputs of the plurality of data stream processing circuits into a single data stream.

27. Apparatus as defined in claim 26, wherein each one of the plurality of data stream processing circuits comprises circuitry for demodulating a data stream.

28. Apparatus as defined in claim 27, wherein each one of the plurality of data stream processing circuits comprises circuitry for decoding a data stream.

29. Apparatus as defined in claim 28, wherein each one of the plurality of data stream processing circuits comprises circuitry for error correcting a data stream.

* * * * *